United States Patent [19]

Wachob

[11] Patent Number: 4,783,846
[45] Date of Patent: Nov. 8, 1988

[54] SWITCHABLE SIGNAL SOURCE MODULE FOR USE WITH CABLE TELEVISION CONVERTER

[75] Inventor: David E. Wachob, Elkins Park, Pa.

[73] Assignee: General Instrument Corporation, New York, N.Y.

[21] Appl. No.: 58,239

[22] Filed: Jun. 4, 1987

[51] Int. Cl.$^4$ .............................................. H04B 11/16
[52] U.S. Cl. ........................................ 455/151; 455/4; 358/86
[58] Field of Search ................... 455/4, 197, 151, 131, 455/347–349, 344; 358/194.1, 86, 84, 114; 301/21, 231, 241

[56] References Cited

U.S. PATENT DOCUMENTS

| | | | |
|---|---|---|---|
| 4,419,768 | 12/1983 | Yamashita et al. | 455/197 |
| 4,484,218 | 11/1984 | Boland et al. | 455/151 |
| 4,527,204 | 7/1985 | Kozakai et al. | 455/4 |
| 4,606,072 | 8/1986 | Martin et al. | 455/4 |
| 4,630,313 | 12/1986 | Damoci | 455/4 |

Primary Examiner—Robert L. Griffin
Assistant Examiner—Curtis A. Kuntz
Attorney, Agent, or Firm—Kramer, Brufsky & Cifelli

[57] ABSTRACT

Remotely switchable signal source modules are mounted to a cable television converter to enable a viewer to select between alternate television signal sources. Power for the module is provided via the converter's RF input terminal, which mates with a corresponding terminal on the module. An RF bypass module enables the viewer to utilize the features of a cable ready television when connected to a cable television network. Simultaneous viewing and recording of different channels can also be accommodated. An input A/B switch module enables the viewer to select between alternate cable system inputs. An output A/B switch module provides compliance with FCC requirements permitting viewing of off-the-air channels not carried on a cable system.

22 Claims, 5 Drawing Sheets

SWITCHABLE SIGNAL SOURCE MODULE FOR USE WITH CABLE TELEVISION CONVERTER

FIELD OF THE INVENTION

The present invention relates to cable television apparatus and, more particularly, to converter mounted switching modules for providing cable television viewers with a choice of different signal sources for input to a television or other video appliance.

BACKGROUND OF THE INVENTION

Video cassette recorders (VCR) are well-known consumer electronics items. These devices receive television signals from an antenna or cable television drop, and can record and play back programs at a user's convenience.

VCR's feature several different modes of operation. An operator can record an incoming program on a video cassette and simultaneously monitor the program on a television set. Alternately, a program already recorded on a video cassette can be viewed directly in place of incoming television signals. VCR's possess a switch (VCR/TV) which enables the operator to view either incoming TV signals or signals from the VCR. In the TV position, the viewer simply selects the channel using the television's own internal tuner in a conventional fashion. The VCR still receives signals from the TV antenna or cable drop, so a program can be recorded simultaneously on a video cassette from a channel selected with the VCR tuner.

Cable television companies offer "premium" channels wherein programs are transmitted in a scrambled mode, requiring a converter/descrambler for proper viewing. In operation, a viewer selects a channel for viewing which is descrambled as needed. These signals are subsequently presented either to the VCR or to the user's television directly, using a tuner internal to the converter/descrambler.

In their most basic configurations, VCR's and converters can be connected together in two straightforward ways; namely, with the converter output serving as the input source to the VCR, or with the VCR output serving as the input source to the converter. Both configurations suffer from well-known limitations.

When the output of the VCR is used to drive the converter, multiple unattended recording and tuning is possible with all non-scrambled ("clear") channels. In this configuration, a clear channel can also be recorded while viewing any other channel. In addition, if the VCR is equipped with a remote control, this unit will still be functional as will remote control through the cable television converter. However, recording of descrambled premium programs is not possible in this configuration, since descrambling occurs at the converter which is downstream from the VCR.

With the cable television converter wired upstream of the VCR, recording of descrambled premium channels is possible. However, since all channel selection must be made using the converter, the VCR remote control is rendered useless for channel selection. In addition, unattended recording on multiple channels is not possible since the cable television converter outputs its signal on only one channel (e.g., channel 3). As a result, desirable "cable ready" capabilities of a user's VCR and television set cannot be enjoyed. Such capabilities would normally allow the viewer to tune to all cable channels using his television or VCR tuning controls without the need to use the cable television converter for tuning clear channels.

In addition to the above, the United States Federal Communications Commission (FCC) has proposed a new regulation that would require cable television system operators to provide an "A/B switch" which would allow cable subscribers access to off-the-air television stations, particularly those no longer required to be carried on the cable system. Such a switch would be placed at the input of the user's television, allowing the user to switch between cable television signals or off-the-air signals from a conventional television antenna. Current cable television converters are not equipped to provide such an A/B switch.

It would be advantageous to provide a switchable signal source module for use with a cable television converter that would enable a user to switch between two different television signal sources, such as those provided by a cable system or a television antenna. It would also be advantageous to provide such a module that would enable a user to select between two alternate cable television sources.

It would further be advantageous to provide a module that improves compatibility between a cable television signal source and a variety of interconnected video appliances, such as a television set and VCR. In such a configuration, the cable ready features of the VCR or television set should be accessible to the user.

The present invention relates to signal source modules providing such advantages.

SUMMARY OF THE INVENTION

In accordance with the present invention, a remotely switchable signal source module is provided for use with a cable television converter of the type having an input terminal for receiving a cable television input signal and an output terminal for outputting a selected television channel signal. The signal source module comprises first terminal means for receiving an input signal from a cable television network and second terminal means for receiving an auxiliary television input signal, for example, a descrambled premium channel output from the cable television converter. Output terminal means are provided for coupling a signal to a video appliance such as a VCR or television set. Means are provided for mounting the signal source module to the cable television converter with the first terminal means electrically coupled to the input terminal of the cable television converter. A relay is provided to enable either the first terminal means or the second terminal means to be selectively coupled to the output terminal means. The relay is actuated in response to an actuation signal provided via the cable television converter input terminal.

In one embodiment, the module of the present invention includes a third terminal adapted to mate with the converter input terminal when the signal source module is mounted to the converter. A signal splitter is provided with an input coupled to the first terminal means, a first output coupling the first terminal means to the relay, and a second output coupling the first terminal means to the third terminal. All electrical power required for the operation of the relay is provided by the actuation signal, which is generated by the converter in response to a command input by a user, e.g., via the user's hand-held remote control unit.

In another embodiment, the remotely switchable signal source module includes first terminal means for receiving a television input signal from a first source (e.g., from a cable television converter), second terminal means for receiving a television input signal from a second source (e.g., a television antenna), and third terminal means for receiving an input signal from a cable television network. Means are provided for mounting the signal source module to a cable television converter with the third terminal means electrically coupled to the converter input terminal. A relay enables output terminal means to selectively couple either a signal from the first source or the second source to an external video appliance. A relay actuator is coupled to receive an actuation signal from the converter input terminal for actuating the relay. A fourth terminal, electrically coupled to the third terminal means, can be provided to mate with the converter input terminal when the signal source module is mounted to the cable television converter.

In yet another embodiment, a remotely switchable signal source module is provided for use with a cable television converter having an input terminal for receiving a cable television input signal and an output terminal for outputting a selected television channel signal. The signal source module comprises first terminal means for receiving an input signal from a first cable television signal source and second terminal means for receiving an input signal from a second cable television signal source. Relay means, coupled to the first and second terminal means and to an output terminal, selectively couples the first terminal means or the second terminal means to the output terminal. Means are provided for mounting the signal source module to the cable television converter with the output terminal in mating engagement with the converter input terminal. Relay actuator means, coupled to receive an actuation signal from the converter input terminal, actuates the relay.

DETAILED DESCRIPTION OF THE INVENTION

Figure 1:
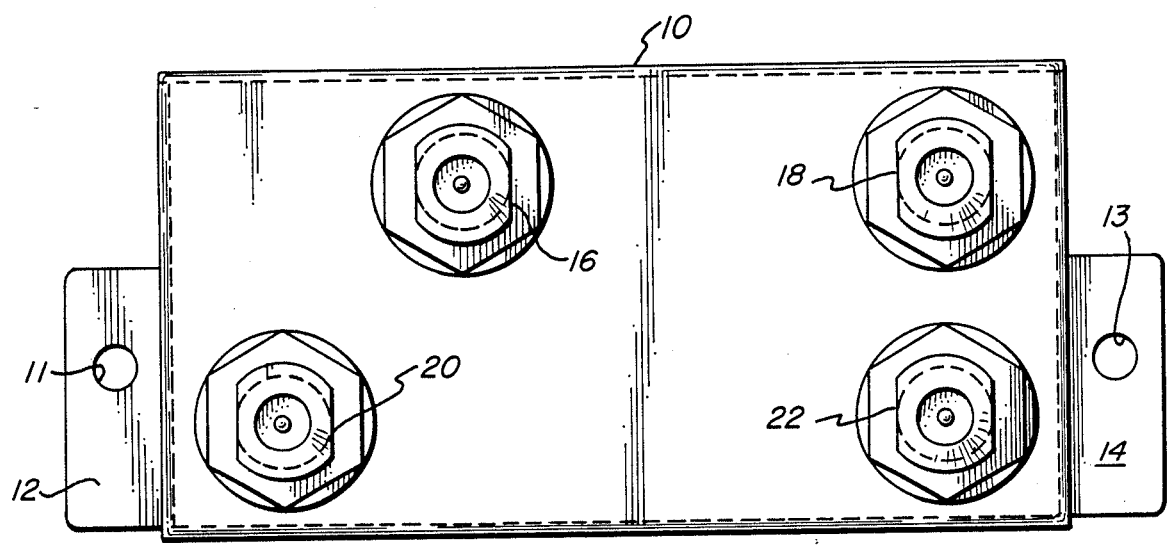
FIG. 1 is a front plan view of a signal source module in accordance with the present invention.
Figure 2:
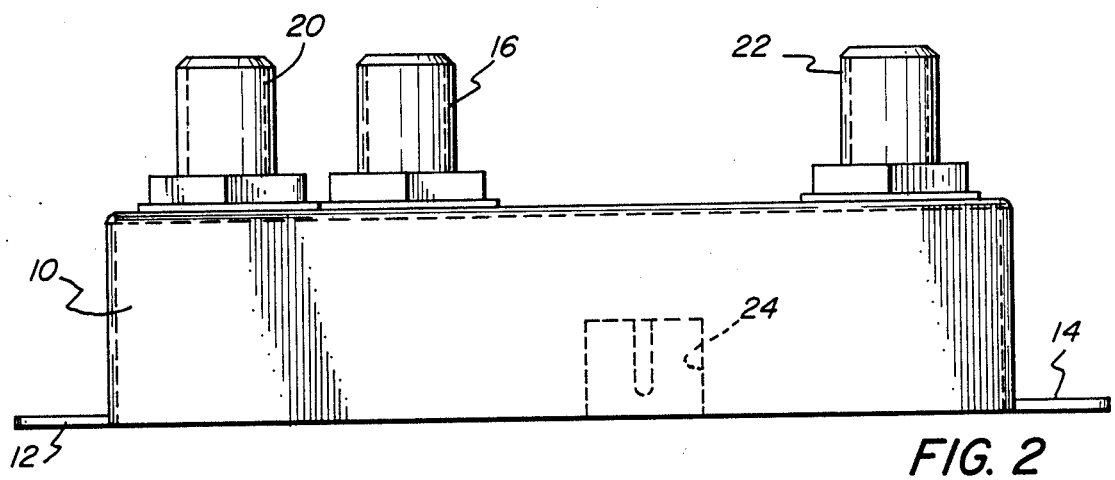
FIG. 2 is a top plan view of the signal source module of FIG. 1.
Figure 3:
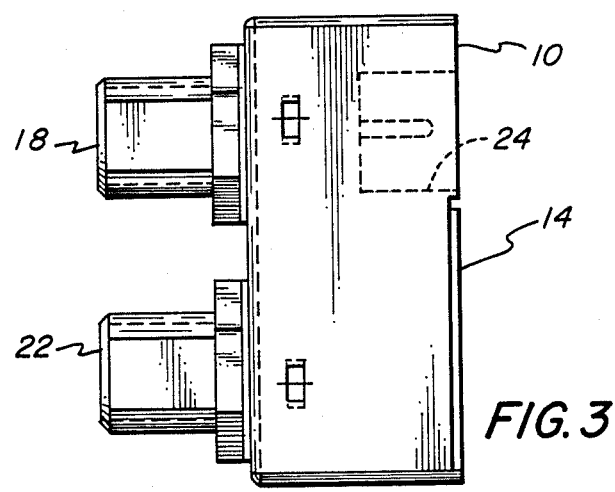
FIG. 3 is a side plan view of the signal source module of FIG. 1.
Figure 4:
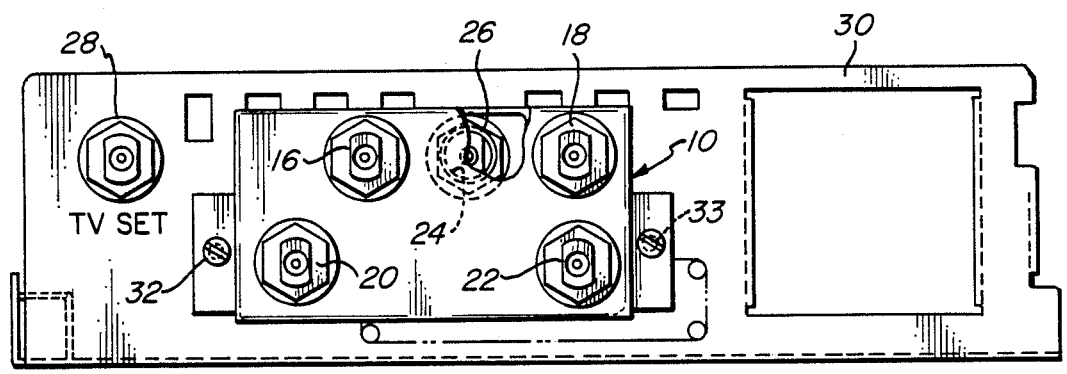
FIG. 4 is a plan view illustrating the signal source module mounted to the back of a cable television converter.

Turning now to the drawings, FIGS. 1-3 illustrate the appearance of one embodiment of a signal source module in accordance with the present invention. The module is contained in a housing 10 which is directly mountable to a cable television converter 30 as shown in FIG. 4. Mounting to the converter is accomplished through mounting tabs 12 and 14, which contain holes 11, 13, respectively, into which threaded fasteners 32, 33 are inserted and fastened to corresponding holes on the rear panel of converter 30.

The signal source module includes several terminals 16, 18, 20, 22, and 24. In the embodiment shown, terminals 16, 18, 20, and 22 are "F connectors" used to couple various cables to the module. Terminal 24 is an "F plug" which mates with a corresponding terminal 26 (the converter's RF input terminal) extending from the back panel of converter 30. When the signal source module is mounted to the cable television converter, electrical coupling between the units is made via module terminal 24 and converter terminal 26.

The various terminals on the signal source module each have a different function. For example, terminal 16 can contain the video output signal which is coupled to a user's video appliance using a standard length of cable having F plugs at each end. Terminal 18 can be the RF input terminal, which accepts an incoming cable signal from a cable television network. Terminal 22 can be an auxiliary RF input terminal, which accepts a television signal from a source such as a television antenna. Terinal 20 can accept yet another television signal, e.g., from the output of the cable television converter. Those skilled in the art will appreciate that the location of the various terminals on the signal source module may be modified, and as will be described below, different embodiments of a signal source module in accordance with the present invention will not use all of the terminals described above.

The physical structure of the signal source module enables field installation on existing converters without any need to modify the converter itself. The module attaches to the converter with only two screws, and when mounted to the converter, electrical interface between the units is provided automatically via terminals 24 and 26. No external power supply is needed for the signal source module, since power is provided to the unit via converter terminal 26.

Figure 5:
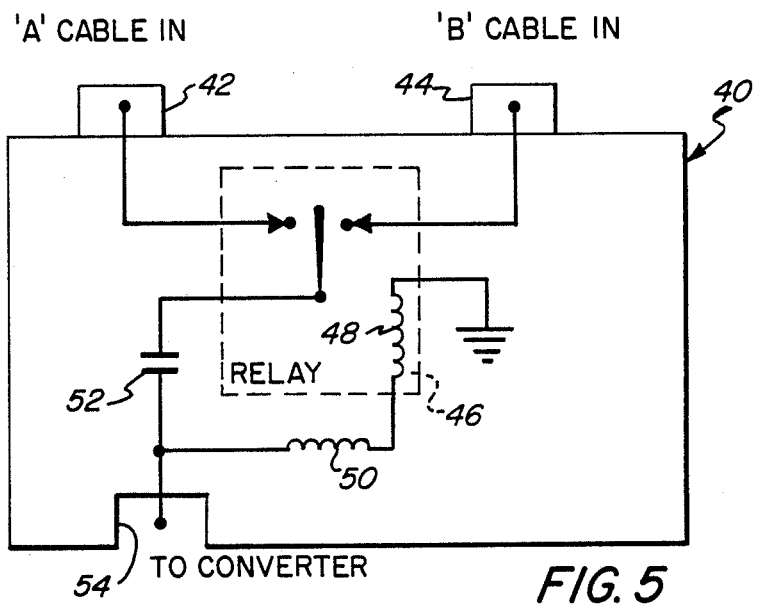
FIG. 5 is a block diagram showing a signal source module in accordance with the present invention used as an input A/B switch.

One embodiment of a signal source module in accordance with the present invention is shown schematically in FIG. 5. The module 40 in this embodiment functions as an input A/B switch, enabling a user to select between programming from a first cable ("A cable") or a second cable ("B cable"). By providing two such cables, a cable system operator can offer twice the number of program channels than otherwise would be available on only a single cable.

Signal source module 40 includes a first terminal 42 for receiving an input signal from a first cable television signal source and a second terminal 44 for receiving an input signal from a second cable television signal source. A relay generally designated 46, is coupled to first and second terminals 42, 44 and selectively couples one or the other of the first and second terminals to an output terminal 54. Output terminal 54 is an F plug which mates with the corresponding RF input connector (i.e., terminal 26 shown in FIG. 4) on a user's cable television converter.

Power for relay 46 is provided in a actuation signal generated by the cable television converter. The actuation signal is input from the converter to module 40 via terminal 54 and comprises the current necessary to drive relay actuator coil 48. A choke 50 prevents the RF cable television signal present at terminal 54 from actuating relay 46. Capacitor 52 prevents the DC relay actuation signal present at terminal 54 from feeding into the incoming cable signal present at either terminal 42 or 44.

Figure 8:
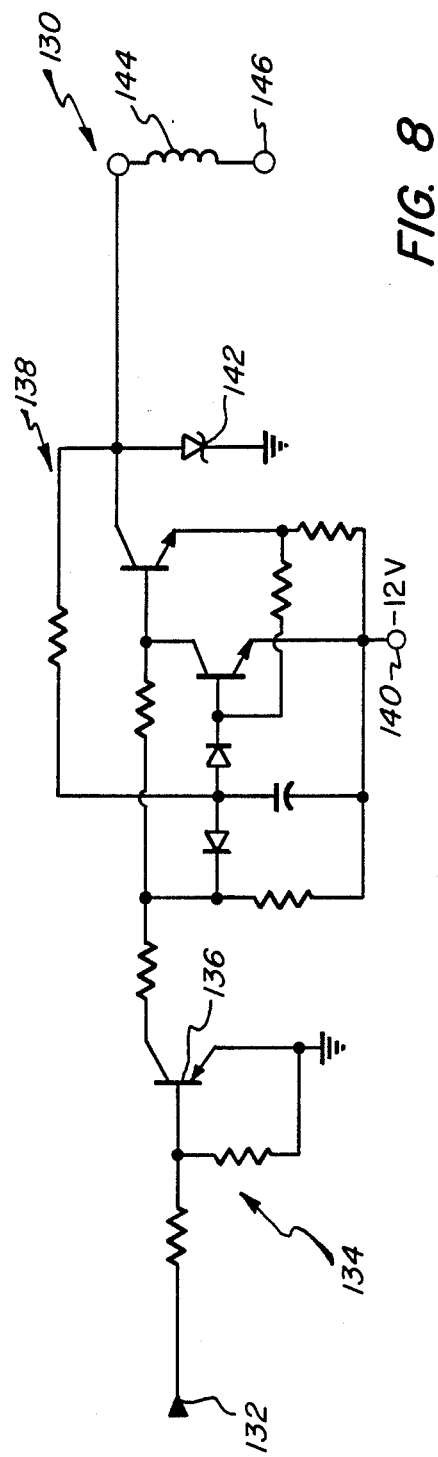
FIG. 8 is a schematic diagram of control circuitry internal to a cable television converter required to provide an actuation signal for the signal source modules of the present invention.

FIG. 8 shows the drive circuit 130 that generates the relay actuation signal. This circuit is internal to the converter. A relay actuation command (e.g., from the converter microprocessor) is input at terminal 132 and passes through a level shifter circuit 134 that is centered around transistor 136. Control circuit 138 is powered by a voltage (e.g., minus 12 volts DC) at terminal 140. When a relay actuation command is received at terminal 132, a relay actuation signal will be output at terminal 146. Such signal may, for example, be minus 12 volts DC at approximately 37 milliamps. Zener diode 142 provides lightning protection to the control circuit should a large voltage spike travel down an incoming television signal cable. Choke 144 passes the DC control signal for actuating the relay, but prevents the television RF signal from feeding into the drive circuit. The relay actuation signal present at terminal 146 is, as previously mentioned, coupled to the signal source module 40 via the converter RF input terminal 26 and module terminal 54.

In a preferred embodiment, the control signal input at terminal 132 is initiated via a user's handheld remote control that is provided together with the cable television converter. Upon actuating an appropriate button on the remote control, a relay actuation signal will be initiated. The relay actuation signal can alternately be initiated via a switch provided on the converter itself. Those skilled in the art will appreciate that such a switch, either on the hand-held remote control unit or on the converter will, when actuated, trigger the converter microprocessor to output the necessary command signal which is input to the circuit of FIG. 8 at terminal 132.

Figure 6:
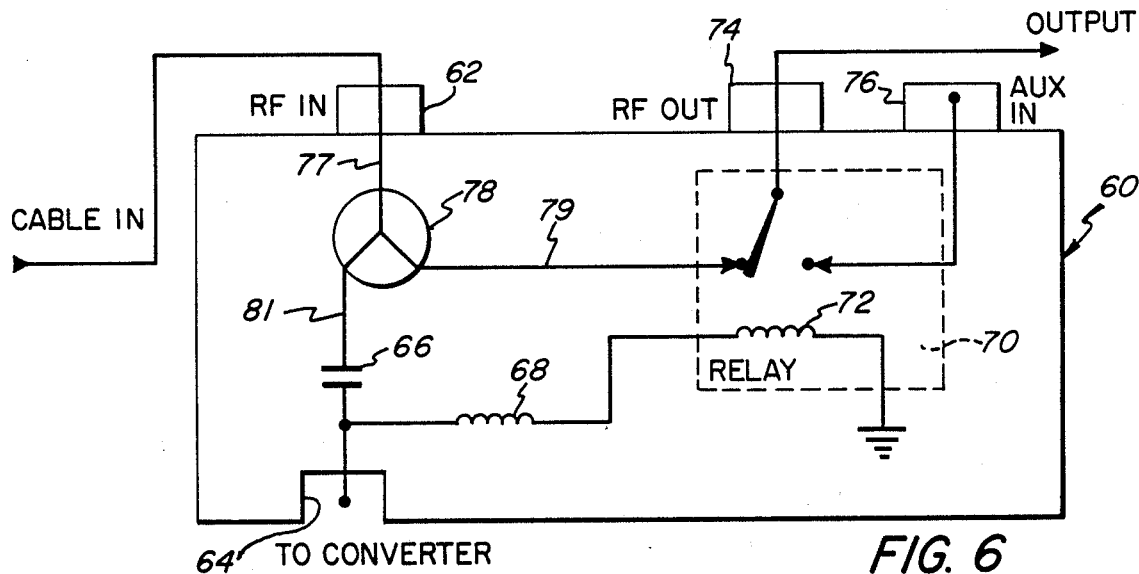
FIG. 6 is a block diagram of a signal source module in accordance with the present invention used to provide a bypass of the RF input signal directly to a video appliance.

Another embodiment of a signal source module in accordance with the present invention is illustrated in FIG. 6. This embodiment provides an RF bypass enabling a user to directly connect an incoming cable signal to a video appliance without passing through the cable television converter. By allowing the converter to be coupled into the RF input path of the video appliance only when required, full compatibility with cable ready televisions, VCR's, or other video appliances is provided. When the cable television converter is needed to descramble a premium channel, the RF bypass is switched out and the converter is switched into the circuit.

As shown in FIG. 6, module 60 includes a first terminal 62 for receiving an RF input signal from a cable television network. A second terminal 76 receives an auxiliary television input signal, e.g., a descrambled premium channel signal from the user's cable television converter. An output terminal 74 is provided for coupling either the input signal at terminal 62 or the input signal at terminal 76 to a video appliance. Terminal 64 provides the interface between module 60 and the cable television converter. When module 60 is mounted to the converter, terminal 64 will mate with the RF input terminal on the converter.

A relay 70 is provided in module 60 and is coupled to first terminal 62, second terminal 76, and output terminal 74. The relay is used to selectively couple either first terminal 62 or second terminal 76 to output terminal 74. Relay actuator 72 actuates the relay upon receipt of an actuation signal from the cable television converter via terminal 64. As described with respect to module 40 of FIG. 5, a choke 68 blocks the RF television signal from relay actuator 72. Capacitor 66 blocks the relay actuation signal from the RF signal path. A signal splitter 78 has an input 77 coupled to first terminal 62, a first output 79 coupling to the RF input signal at terminal 62 to relay 70, and a second output 81 coupling the RF input signal at terminal 62 to terminal 64. In this manner, the RF input signal of terminal 62 is coupled both to relay 70 and to the cable television converter. Although the signals output from splitter 78 are attenuated approximately 3.5 dB from their original level, the split signals will provide an acceptable level of operation.

FIGS. 6A-6D illustrate various configurations of the RF bypass module 60. In all of the illustrated configurations, module 60 is mounted to cable television converter 80 with module terminal 64 in mated engagement with converter input terminal 82.

Figure 6A:
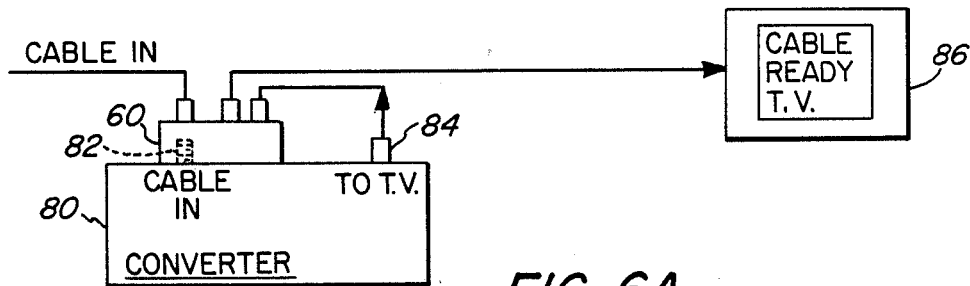
FIGS. 6A-6D illustrate various ways to interconnect the signal source module of FIG. 6 to provide different features.

In the configuration shown in FIG. 6A, terminal 74 of module 60 is coupled directly to a cable ready television set 86. Auxiliary input terminal 76 of module 60 is fed directly from the output terminal 84 of the converter. In this configuration, cable ready capabilities are restored to television 86, since the user would normally switch module 60 so that the RF input signal from the cable network (at terminal 62) is coupled directly via terminal 74 to the television set. Relay 70 would be switched to couple the television set to the output of converter 80 (via converter ouput terminal 84) only when the converter was needed to descramble a premium channel.

Figure 6B:
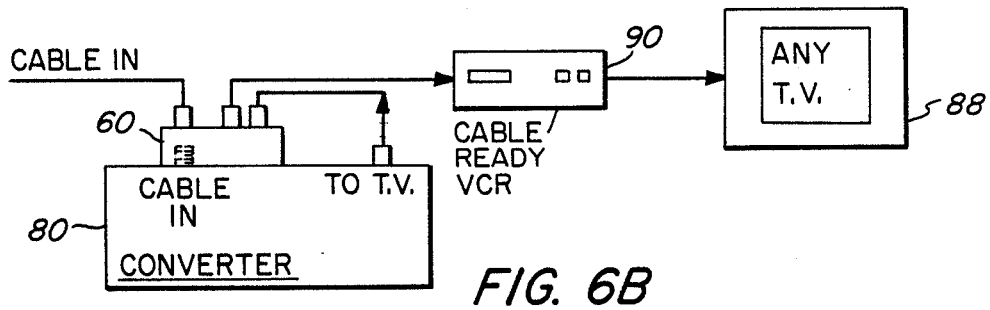

The configuration shown in FIG. 6B restores cable ready capabilities to a cable ready VCR 90 connected to a television set 88 (which does not have to be cable ready).

Figure 6C:
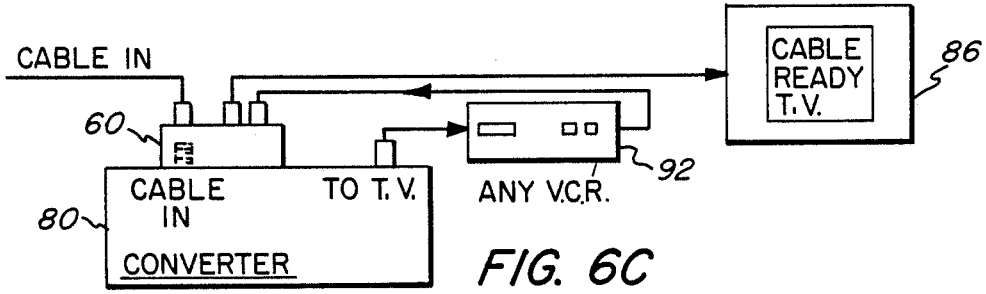

In the configuration of FIG. 6C, cable ready capabilities are restored to a cable ready TV 86 and a VCR 92 is enabled to record any channel (including a descrambled premium channel) when the user is simultaneously watching any non-premium channel (or the premium channel being recorded by VCR 92).

Figure 6D:
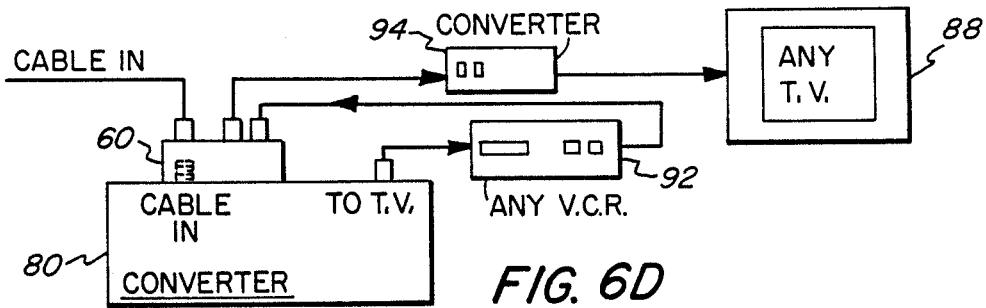

In the configuration of FIG. 6D, an additional converter 94 is provided so that simultaneous viewing and recording of separate premium channels may occur.

Figure 7:
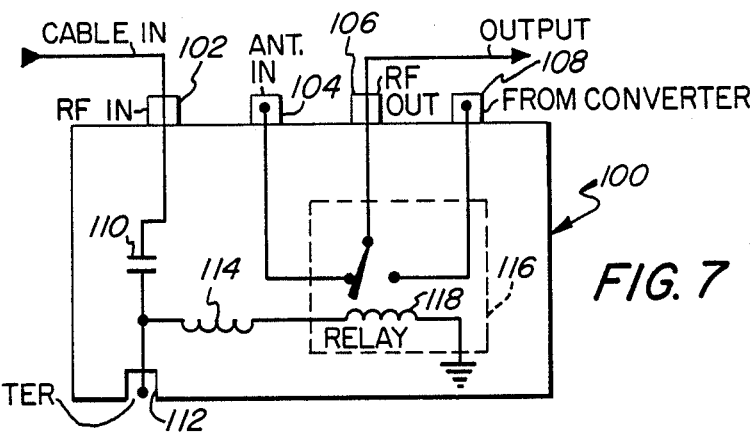
FIG. 7 is a block diagram of a signal source module in accordance with the present invention for providing an A/B switch enabling the user to select an antenna or a cable signal as a television signal source.

FIG. 7 illustrates yet another embodiment of a switchable signal source module in accordance with the present invention. This embodiment provides a remote controllable A/B switch in accordance with the recent FCC requirements that an antenna connection be provided to a user's television for viewing of off-air stations not carried on the cable system.

Module 100 contains a first terminal 108 for receiving a television input signal from a first source, such as the output of a cable television converter. A second terminal 104 is provided for receiving a television input signal from a second source, such as an antenna. A third terminal 102 receives an input signal from a cable television network. An output terminal 106 is provided for selectively coupling either the signal at terminal 108 or the signal at terminal 104 to a user's video appliance.

As in the embodiment shown in FIGS. 5 and 6, relay 116 is driven by an actuation signal generated by the cable television converter and coupled to relay actuator 118 via terminal 112. Terminal 112 also carries the RF input cable signal from terminal 102 to the converter. Choke 114 prevents RF energy from reaching relay actuator coil 118. Capacitor 110 prevents the relay actuation signal from passing into the cable network.

FIGS. 7A–7D illustrate various configurations for using module 100, which is mounted to converter 80. Module terminal 112 mates with converter input terminal 82. Converter output terminal 84 carries the television channel signal to which the converter is tuned.

Figure 7A:
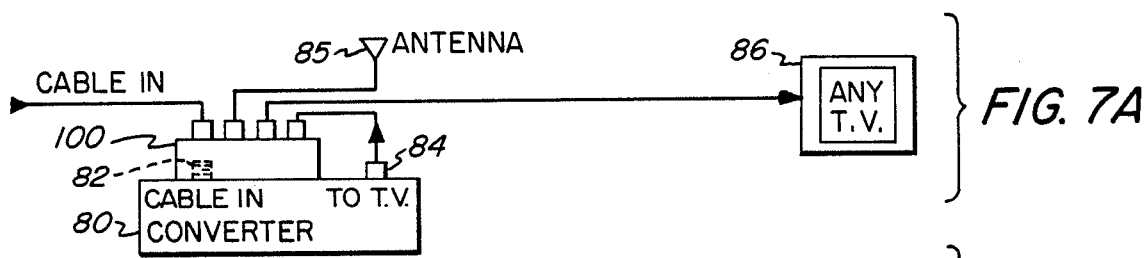
FIGS. 7A-7D illustrate various ways to interconnect the signal source module of FIG. 7 to provide different features.

In the configuration shown in FIG. 7A, a television 86 can receive either signals from the cable television network or off-the-air channels from an antenna 85.

Figure 7B:
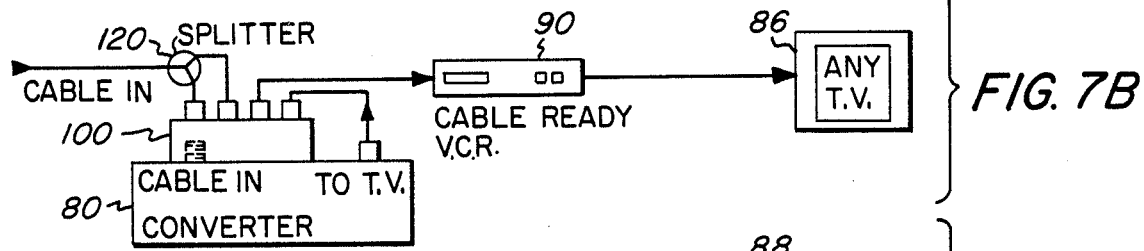

In the configuration shown in FIG. 7B, a splitter 120 is provided so that the incoming cable signal can be input directly to terminals 102 and 104. A cable ready VCR 90 is wired in series with output terminal 106 and television 86. This configuration restores cable ready capabilities to the VCR and television for all non-scrambled channels.

Figure 7C:
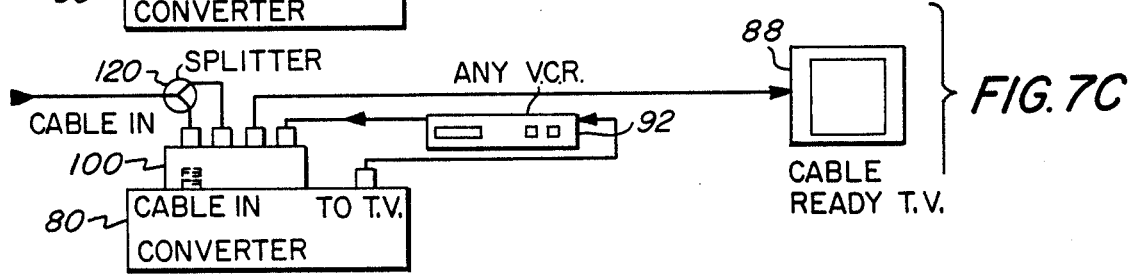

In the configuration of FIG. 7C, a VCR 92 (which does not have to be cable ready) receives the converter output. The output of the VCR is input to module 100 at terminal 108. In this manner, cable ready capabilities are restored to cable ready television 88 and VCR 92 can independently record any channel to which the converter is tuned, including premium channels.

Figure 7D:
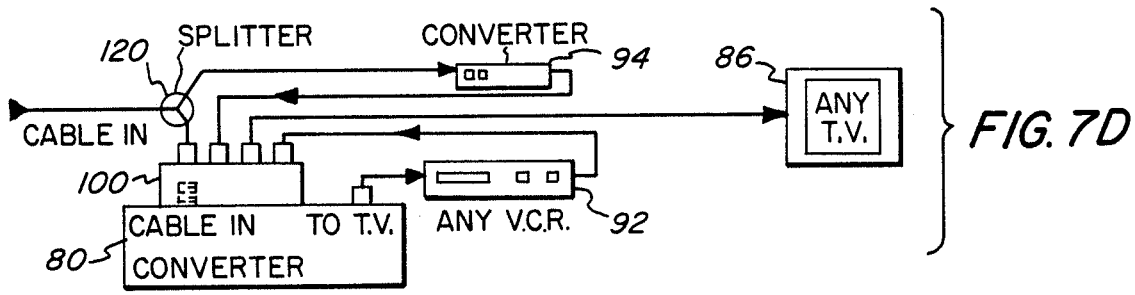

In the configuration of FIG. 7D, simultaneous viewing and recording of separate descrambled channels is provided through the use of an additional converter 94.

It will now be appreciated that the present invention provides remotely switchable signal source modules which may be directly mounted to existing cable television converters. The modules can be installed in the field, without the need to open the converter. Control and power for the modules is provided from the converter through the converter's RF input connector. Various configurations overcome the past difficulty of simultaneously viewing and recording separate descrambled channels in a user friendly manner. Compliance with the FCC requirements for viewing of off-the-air channels which are not provided by a cable system is also provided.

Although the invention has been described in connection with several preferred embodiments, those skilled in the art will appreciate that various modifications and adaptations may be made thereto without departing from the spirit and scope of the invention as set forth in the following claims.

What is claimed is:

1. A television system comprising a switchable signal source module and a cable television converter, said cable television converter comprising:
   an input/output terminal for receiving a television input signal and outputting a relay control signal;
   means for generating sadi relay control signal and transmitting said relay control signal to said input/output terminal; and
   television signal output terminal means for outputting a converted television channel signal; and said signal source module comprising:
   first input terminal means for receiving a first input signal from a first cable television signal source;
   second input terminal means for receving a second input signal from a second television signal source;
   an input/output terminal;
   relay means, having first and second television signal input ports coupled respectively to said first and second input terminal means, having a television signal output port coupled to said input/output terminal of said module, and having a relay control input port coupled to said input/output terminal of said mouule, for selectively coupling said first input terminal means or said second input terminal means to said input/output terminal of said module based on said relay control signal; and wherein
   said signal source module is mounted to said cable television converter with said input/output terminal of said module being electrically coupled to said input/output terminal of said cable television converter.

2. A television system as set forth in claim 1 further comprising means for isolating said relay control input port from said television signal output port of said relay means.

3. A television system as set forth in claim 2 wherein the isolating means comprises a capacitor connected between said television signal output port of said relay means and said input/output terminal of said signal source module.

4. A television system as set forth in claim 1 wherein said relay means comprises an actuator coil coupled to said relay control input port, and the first cable television signal, the second television signal, and said relay control signal are the only electrical inputs required by said signal source module.

5. A television system as set forth in claim 1 wherein said cable television converter includes means for generating said relay control signal in response to a command input by a user.

6. A television system as set forth in claim 1 wherein said input/output terminal of said module comprises a recessed, male member, and said input/output terminal of said converter comprises a protruding female member which is mated with said recessed male member.

7. A television system comprising a switchable signal source module and a cable television converter, said cable television converter comprising:
   an input/output terminal for receiving a cable television input signal and outputting a relay control signal;
   means for generating said relay control signal and transmitting said relay control signal to said input/output terminal; and
   a television signal output terminal for outputting a converted television channel signal; and said signal source module comprising:
   first input terminal means for receiving an input cable television signal;
   second input terminal means, coupled to said television signal output terminal of said converter, for receiving said cable television input signal after conversion;
   output terminal means for coupling to a video appliance;
   an input/output terminal coupled to said first input terminal means of said module, said signal source module being mounted to said cable television converter with said input/output terminal of said module being electrically coupled to said input/output terminal of said converter; and relay means, having first and second televison signal input ports coupled respectively to said first and second input terminal means of said module, a television signal output port coupled to said output terminal means of said module, and a relay control input port coupled to said input/output terminal of said module, for selectively coupling said first input terminal means or said second input terminal means to said output terminal means based on said relay control signal.

8. A television system as set forth in claim 7 further comprising:
a signal splitter having an input leg coupled to said first input terminal means of said module, a first output leg coupled to said first television signal input port of said relay means, and a second output leg coupled to said input/output terminal of said module.

9. A television system as set forth in claim 7 wherein said relay means comprises an actuator coil coupled to said relay control input port, and said input cable television signal, the coverted input television signal, and said relay control signal are the only electrical inputs required by said signal source module.

10. A television system as set forth in claim 7 wherein said converter is responsive to a command input by a user to generate said relay conrol signal.

11. A televison system as set forth in claim 8 further comprising means for isolating said second output leg of said signal splitter from said relay control input port of said relay means.

12. A television system as set forth in claim 11 wherein the isolating means comprises a capacitor interposed between said second output leg of said signal splitter and said input/output terminal of said module.

13. A television system as set forth in claim 7 futher comprising a VCR interposed between said second input terminal means of said module and said television signal output terminal of said converter.

14. A television system as set forth in claim 13 further comprising a second converter interposed between said output terminal means of said module and said video appliance.

15. A television system as set forth in claim 7 wherein said input/output terminal of said module comprises a recessed, male member, and said input/output terminal of said converter comprises a protruding female member which is mated with said recessed male member.

16. A television system comprising a switchable signal source module and a cable televison converter, said cable television converter comprising:
an input/output terminal for receiving a cable television input signal and outputting a relay control signal;
means for generating said relay control signal and transmitting said relay control signal to said input/output terminal; and
television signal output terminal means for outputting a converted television channel; and said signal source module comprising:
first input terminal means for receiving an input signal from a cable television source;
second input terminal means for receiving a television signal from a second source;
third input terminal means, coupled to said television signal output terminal means of said converter, for receiving said cable television signal after conversion;
output terminal means for outputting a television channel signal to a video appliance;
an input/output terminal coupled to said first input terminal means of said module, said signal source module being mounted to said cable television converter with said input/output terminal of said module electrically coupled to said input/output terminal of said converter; and
relay means, having first and second television signal input ports coupled respectively to said second and third input terminal means of said module, having a television signal output port coupled to said output terminal means of said module, and having a relay control input port coupled to said input/output terminal of said module, for selectively coupling said second input terminal means or said third input terminal means of said module to said output terminal means of said module based on said relay control signal.

17. A television system as set forth in claim 16 wherein said module further comprises:
means for isolating said first input terminal means from said relay control input port.

18. A television system as set forth in claim 17 wherein the isolating means comprises a capacitor interposed between said first input terminal means and said input/output terminal of said module.

19. A television system as set forth in claim 16 further comprising a VCR interposed between said output terminal means of said converter and said third input terminal means of said module.

20. A television system as set forth in claim 19 further comprising a second converter interposed between said first input terminal means of said module and said second input terminal means of said module.

21. A television system as set forth in claim 16 wherein said relay means comprises an actuator coil coupled to said relay control input port, and said input cable television signal from said first source, said television signal from said second source, the converted input television signal, and said relay control signal are the only electrical inputs required by said signal source module.

22. A television system as set forth in claim 16 wherein said input/output terminal of said module comprises a recessed, male member, and said input/output terminal of said converter comprises a protruding female member which is mated with said recessed male member.

* * * * *

UNITED STATES PATENT AND TRADEMARK OFFICE
CERTIFICATE OF CORRECTION

PATENT NO. : 4,783,846
DATED : November 8, 1988
INVENTOR(S) : David E. Wachob

It is certified that error appears in the above-identified patent and that said Letters Patent is hereby corrected as shown below:

In Claim 1, column 7, line 61 of the Patent, change "sadi" to - - said - - .

In Claim 1, column 8, line 10 of the Patent, change "mouule" to - - module - - .

Signed and Sealed this

Seventh Day of March, 1989

Attest:

DONALD J. QUIGG

*Attesting Officer*    *Commissioner of Patents and Trademarks*